(12) United States Patent
Rieber (10) Patent No.: US 9,167,921 B2
(45) Date of Patent: Oct. 27, 2015

(54) BABY HEADREST

(76) Inventor: Michael Rieber, Livingston, NJ (US)

( * ) Notice: Subject to any disclaimer, the term of this patent is extended or adjusted under 35 U.S.C. 154(b) by 919 days.

(21) Appl. No.: 13/208,121

(22) Filed: Aug. 11, 2011

(65) Prior Publication Data

US 2011/0289687 A1 Dec. 1, 2011

Related U.S. Application Data

(63) Continuation-in-part of application No. 12/584,524, filed on Sep. 8, 2009, now abandoned.

(60) Provisional application No. 61/095,349, filed on Sep. 9, 2008.

(51) Int. Cl.
| | | |
|---|---|---|
| *A47G 9/10* | (2006.01) | |
| *A47D 13/00* | (2006.01) | |
| *B60N 2/28* | (2006.01) | |
| *B60N 2/48* | (2006.01) | |
| *B60N 2/70* | (2006.01) | |

(52) U.S. Cl.
CPC ............. *A47G 9/10* (2013.01); *B60N 2/2851* (2013.01); *B60N 2/4879* (2013.01); *B60N 2/7005* (2013.01); *A47D 13/00* (2013.01)

(58) Field of Classification Search
CPC ....... A47G 9/10; A47G 9/0253; A47G 9/083; A47D 13/00; A47D 13/083
USPC .......... 5/644, 636, 490, 654, 655, 655.5, 909, 5/676, 655.9, 740, 953
See application file for complete search history.

(56) References Cited

U.S. PATENT DOCUMENTS

| | | | | |
|---|---|---|---|---|
| 3,308,491 A | * | 3/1967 | Spence | 5/676 |
| 3,548,420 A | * | 12/1970 | Spence | 623/37 |
| 3,663,973 A | * | 5/1972 | Spence | 528/15 |
| 3,689,948 A | * | 9/1972 | Graves et al. | 524/379 |
| 3,737,930 A | * | 6/1973 | Smith, III | 5/676 |
| 3,858,379 A | * | 1/1975 | Graves et al. | 53/431 |
| 4,164,798 A | * | 8/1979 | Weber | 297/452.26 |
| 4,380,569 A | * | 4/1983 | Shaw | 428/297.4 |
| 4,457,032 A | * | 7/1984 | Clarke | 297/219.1 |
| 4,607,403 A | | 8/1986 | Alivizatos | |
| 5,121,962 A | * | 6/1992 | Weber et al. | 297/214 |
| 5,475,882 A | * | 12/1995 | Sereboff | 5/655.4 |
| 5,590,430 A | * | 1/1997 | Sereboff | 5/655.5 |
| 5,865,180 A | | 2/1999 | Sigfrid | |
| 6,001,076 A | * | 12/1999 | Wilson et al. | 602/39 |

(Continued)

FOREIGN PATENT DOCUMENTS

WO WO 2007/041509 4/2007

OTHER PUBLICATIONS

Akton Polymer Smooth Pads Document—The Wright Stuff, Inc.

*Primary Examiner* — Robert G Santos
(74) *Attorney, Agent, or Firm* — Gearhart Law, LLC (57) ABSTRACT

A headrest designed for an infant. The headrest has a sleeve with flat top and bottom surfaces. The inner cavity of the sleeve is filled with a dry, visco-elastic polymer cushioning material having a 50% compression force deflection in a range of 2.5 to 3.5 psi. The cushioning material also has a 25% compression force deflection in a range of 0.25 psi to 1 psi. The sleeve has a dimension of between 3 inches to 12 inches and is between ¼ inch and 2 inches thick. The sleeve has a specialized cover to protect it from dirt and damage. The cover contains an opening and closing mechanism to allow insertion and removal of the polymer filled sleeve.

12 Claims, 5 Drawing Sheets

(56) References Cited

U.S. PATENT DOCUMENTS

| | | | |
|---|---|---|---|
| 6,052,850 A | 4/2000 | Salido | |
| 6,226,820 B1 | 5/2001 | Navarro | |
| 6,321,403 B1 | 11/2001 | Matthews | |
| 6,516,483 B1 | 2/2003 | VanSteenburg | |
| 6,536,058 B1 | 3/2003 | Chang | |
| 6,829,794 B2 | 12/2004 | Lenyo | |
| 6,877,176 B2 | 4/2005 | Houghteling | |
| 6,951,035 B2 * | 10/2005 | Kinchen et al. | 5/420 |
| 7,350,252 B2 | 4/2008 | Telegadis | |
| 7,363,667 B2 | 4/2008 | Borror | |
| 2002/0112287 A1 | 8/2002 | Thomas | |
| 2003/0097713 A1 * | 5/2003 | Kinchen et al. | 5/652 |
| 2004/0181878 A1 | 9/2004 | Stelnicki | |
| 2005/0076444 A2 | 4/2005 | Houghteling | |
| 2005/0210592 A1 | 9/2005 | Littlehorn | |
| 2005/0217030 A1 | 10/2005 | Seigler | |
| 2006/0096031 A1 | 5/2006 | Foster | |
| 2006/0244299 A1 | 11/2006 | Snedeker | |
| 2007/0056109 A1 | 3/2007 | Forshpan | |
| 2007/0082189 A1 * | 4/2007 | Gillette | 428/304.4 |
| 2007/0199151 A1 | 8/2007 | Brown | |
| 2008/0034505 A1 | 2/2008 | Thomas | |
| 2008/0201854 A1 * | 8/2008 | Ellis | 5/655 |
| 2010/0058538 A1 * | 3/2010 | Rieber | 5/644 |
| 2010/0058539 A1 * | 3/2010 | Rieber | 5/646 |
| 2011/0289687 A1 * | 12/2011 | Rieber | 5/636 |
| 2012/0028024 A1 * | 2/2012 | Obi et al. | 428/304.4 |
| 2012/0054967 A1 * | 3/2012 | Rieber | 5/648 |
| 2013/0035413 A1 * | 2/2013 | Obi et al. | 521/176 |
| 2014/0352069 A1 * | 12/2014 | Verde Sanchez et al. | 5/636 |

* cited by examiner

BABY HEADREST

CLAIM OF PRIORITY

This application is a Continuation-in-Part application of, and claims priority to, U.S. patent application Ser. No. 12/584,524 filed on Sep. 8, 2009, the contents of which are fully incorporated herein by reference. That application, in turn, claims priority to U.S. provisional application No. 61/095,349 filed on Sep. 9, 2008, the contents of which are fully incorporated herein by reference.

FIELD OF THE INVENTION

The invention relates to infant care, and more precisely, to a head cushion for an infant or toddler.

BACKGROUND OF THE INVENTION

The present invention discloses a headrest for an infant or toddler. Doctors suggest that babies need some form of head support to maintain a supine position. This position helps keeps the air paths unobstructed, thus reducing the chances of Sudden Infant Death Syndrome (SIDS). Until now, the headrests available were inadequate, bulky or contained contours around a baby's head, to prevent a "flat head" condition. These contours did not appear to account for a baby's restless nature as any shift of position by an infant would diminish the benefit of special contours and cutouts.

The present invention is a vast improvement over the prior art, since the headrest is thin enough for use by an infant, small enough to be placed in any crib or a child car seat, and soft enough to prevent flat headedness, as well as eliminating the need for head supporting contours.

Such a headrest may appear to be a simple item to design, but to make one that is light weight and performs its function well, requires ingenuity and a fair knowledge of appropriate material properties.

A comfortable support requires several, seemingly contradictory components. The support material must be soft—but firm. That is, the material must be soft enough that the infant's head will sink in and spread the support over as much of the head as possible, both for comfort and stability. But the support must also provide sufficient resistance when deformed so that a reasonable thickness of material can be used without the head sinking right through to any underlying hard surface. And, though the support material must deform rapidly to adjust to the shape of the head, when the head is moved, the support material must recover rapidly to its original thickness and shape.

A relevant property of padding materials is the pressure they support when compressed to half their original thickness. An average 1 year old infant weighs about 20 lbs, about a quarter of which is accounted for by their head. The 5 pound head should be supported over an area of the head of about 1.5 to 2 square inches, so that a support of between 2.5 to 3.5 psi (pounds/square inch) is required.

However, fleece, for instance, exerts a pressure of only 0.75 psi (pounds per square inch) when compressed to 50% of it's original thickness, so a fleece support would have to be about six inches thick to prevent the infant's head sinking through the support and resting on the underlying hard mattress or other support surface.

Foams, such as polyurethane foams, sometimes referred to as "Memory Foams", are firmer, but still not supportive enough for a comfortable pillow of reasonable dimensions as they only exert pressures of about 1.8 psi at 50% compression.

Silicone rubber, on the other hand, exerts a pressure of about 5-10 psi at only 25% compression, and would, therefore, be too hard to provide a comfortable support. Even soft natural rubber exerts a pressure of about 3 psi at 25% compression and, therefore, would not deform enough to spread the load sufficiently to make a comfortable pillow.

What is required is a suitable material that has the right balance of firmness and deformation to provide cushioning and support, while keeping the size thickness of the invention to a minimum. Suitable visco-elastic gel materials are available that address medicinal or therapeutic needs for elevating heels and elbows, or as cushioning to safeguard limbs from possible injury. However, the need for thin compact pillows for infants has not yet been adequately addressed.

The present invention addresses this unmet need by providing a headrest which incorporates a suitably selected visco-elastic gel in an appropriate packaging so that it is thin enough for use by an infant, small enough to be placed in any crib or a child car seat, and soft enough to prevent flat headedness.

Known prior art headrests include U.S. Pat. Nos. 6,052,820; 6,321,403; 6,536,058; and U.S. Patent Application No. 20060096031.

U.S. Pat. No. 6,052,820 discloses a support device for newborns, including premature babies, comprising a doughnut-shaped structure having a gel-filled GORE-TEX casing of about five to six inches outer diameter with a central aperture of about two to three inches in diameter. The structure provides an annular tube having about a 1 to 2 inch diameter. The tube is preferably circular in cross-section at the rear or head region and preferably flattened to provide a generally oval cross-section at the front or neck region. The case is filled with a cohesive gel mass such as silicone gel or silicone elastomers with sufficiently cross-linked polysiloxane networks to substantially retain a selected shape despite the force of a limited incident weight.

U.S. Pat. No. 6,321,403 discloses a support pillow for supporting a head or a person when in a supine position comprises a cushion member having a support region at least partially surrounding a pressure relief region. The support region is configured to support at least a portion of a head, and the pressure relief region is configured to receive at least a portion of a back side of the head such that pressure applied to the back side of the head is reduced when lying in a supine position.

The U.S. Pat. No. 6,536,058 describes a headrest device for holding the neck and head of infants to assist the development of the shape of their skull. The device includes a base, the outside contour of which is concave for holding the head and designed according to the measurement of the average of different head shapes of normal newborn babies. A depressed segment of the base is used to support the infant's typically weak neck. A removable supplement and a direct-contact piece are included as well in this headrest device.

The U.S. Patent Application No. 20060096031 discloses a baby sleeping cushion and method of use thereof, wherein the cushion is wedge-shaped and comprises two principal layers, a top layer and a bottom layer. The bottom high-density foam provides a firm backing or support and the selected elevation from head end to foot end. The visco-elastic or memory foam top layer molds to the body form of a baby, retarding lateral movement of the baby, and preventing the baby from rolling from side-to-side. In addition to the two-layer wedge-shaped cushion, a separate cushioning device, generally hemispherical in shape, is removably secured to the wedge-shaped cushion, and supports the baby's legs and buttocks; thereby preventing movement of the baby in response to the inclined slope of the wedge-shaped cushion. An additional embodiment provides a support pillow to restrain the baby's head from movement removably-secured to the wedge-shaped cushion.

All of the patents above disclose specialized contraptions that address a specific problem in the art of baby headrests. The present invention, however, aims to remedy all of the problems with a single solution by using a specialized gel filling made from Akton®, which is a polymer that is soft yet supportive, providing a comfortable level of elevation for babies and toddlers. Nor does the present invention require specialized grooves and cutouts to prevent a "flat head" condition since the filler and the overall shape and size of the invention will provide ample support in spots where it is needed most.

Various implements are known in the art, but fail to address all of the problems solved by the invention described herein. One embodiment of this invention is illustrated in the accompanying drawings and will be described in more detail herein below.

SUMMARY OF THE INVENTION

The present invention is a baby headrest for supporting an infant's head. In a preferred embodiment, the baby headrest includes a sleeve and a suitable cushioning material disposed within the sleeve. The cushioning material preferably has a 50% compression force deflection in a range of 2.5 to 3.5 psi.

In a highly preferred embodiment, the pillow's cushioning material may be a dry, visco-elastic polymer that has a 25% compression force deflection that is in a range of 0.25 psi to 1 psi, in addition to having a 50% compression force deflection in a range of 2.5 to 4 psi.

In one embodiment of the support, the cushioning material has a thickness in a range of 0.25 inches to 2 inches, and a compression set characteristic such that after being compressed to 50% of an original thickness for 22 hours, the material returns to 100% of said original thickness.

Therefore, the present invention succeeds in conferring the following, and others not mentioned, desirable and useful benefits and objectives.

It is an object of the present invention to provide a baby and toddler headrest.

It is an object of the present invention to provide a headrest which would be thin, light, tear resistant, stain resistant, non-flammable, and hypoallergenic.

It is an object of the present invention to provide a headrest that will not be easily displaced by the toddler, by having a frictional surface.

It is an object of the present invention to provide a headrest to potentially reduce occurrences of a Sudden Infant Death Syndrome (SIDS).

It is an object of the present invention to provide a headrest to prevent "flat head" condition that is caused by prolonged lying in a supine position.

It is an object of the present invention to provide a headrest filled with Akton® polymer.

It is an object of the present invention to provide a headrest that has a removable pouch that is made of supple material.

It is an object of the present invention to provide a pouch that contains an opening to admit a headrest, and said opening having a closing mechanism.

It is an object of the present invention to provide a baby and toddler headrest for a car seat.

DESCRIPTION OF THE PREFERRED EMBODIMENTS

The preferred embodiments of the present invention will now be described with reference to FIG. 1-9 of the drawings. Identical elements in the various figures are identified with the same reference numerals.

Figure 1:
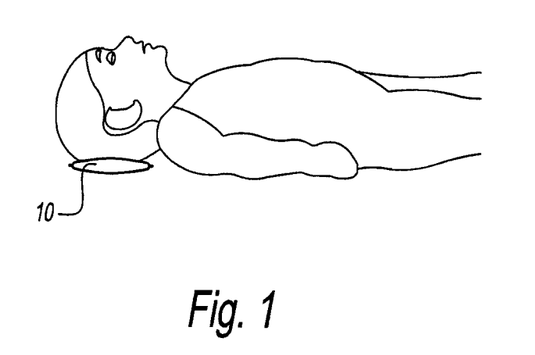
FIG. 1 is a side view of the preferred function of the present invention, showing a child using the cushion as a headrest while lying in a supine position.

The invention discloses a headrest for infants and toddlers that can be used anywhere a child sleeps or lies down, including but not limited to, in cribs, bassinets, child car seats, changing tables, especially flip down flip tables at public restrooms, rockers and high chairs. As will be described later, the present invention may contain Velcro style hooks, elastic strips or non-elastic bands so that the device may be easily and securely affixed to an upright surface, a flat substantially smooth or slippery surface, or any cloth covered surface. FIG. 1 shows a cushion 1 with sleeve 10 being used by an infant or toddler to maintain proper posture or for comfort. A child this young, i.e., a child between the ages of a few months to a few years, cannot comfortably or safely use a conventional pillow due to its thickness. Despite the thinness of the present invention the sleeve 10 is still able to have enough room for indentation of the top surface when pressed upon by a child's head. The thickness of the sleeve may range from ¼ inch to 4" inches, with a preferred thickness from ½ to 1 inch. The diameter of the sleeve may range from 3 to 12 inches with a preferred diameter of about 6 inches.

A relevant property of padding materials is the pressure they support when compressed to half their original thickness. An average 1 year old infant weighs about 20 lbs, about a quarter of which is accounted for by their head. The 5 pound head should be supported over an area of the head of about 1.5 to 2 square inches, so that a support of between about 2.5 to 3.5 psi (pounds/square inch) is required.

Most cushioning materials are either too soft or too hard to meet this requirement.

Fleece, for instance, only exerts a pressure of only 0.75 psi (pounds per square inch) when compressed to 50% of its original thickness. A fleece heel support would have to be about six inches thick to prevent the infant's head sinking through the support and resting on the underlying hard mattress or other support structure, making it far too bulky.

Foams, such as polyurethane foams, sometimes referred to as "Memory Foams", are firmer, but still not supportive enough for a comfortable headrest of reasonable dimensions as they only exert pressures of about 1.8 psi at 50% compression. Silicone rubber, on the other hand, exerts a pressure of about 5-10 psi at only 25% compression, and would, therefore, be too hard to provide a comfortable support.

Even soft natural rubber exerts a pressure of about 3 psi at 25% compression and, therefore, would not deform enough to spread the load sufficiently to make a comfortable headrest.

In a highly preferred embodiment, the support's cushioning material may have a 25% compression force deflection that is in a range of 0.25 psi to 1 psi, in addition to having a 50% compression force deflection in a range of 2.5 to 3.5 psi. Such a material will initially deform rapidly to provide a comparatively large area of support for the user's heel. Then, as the heel sinks in, the material's visco-elastic properties may result in a non-linear increase in the support pressure, so that when the material has compressed to around 50% of its original thickness, it may now fully support the heel.

Offering such little resistance to small deflections also means that such a material does not exhibit strong shear forces in response to small movements. This translates into a more comfortable experience for the user, One such material that may be used is AKTON™, a vulcanized, cross-linked rubber material that behaves as a dry, visco-elastic material, and may be supplied by Action Products, Inc., Hagerstown, Md. 2174, USA.

Tables 1 and 2 below show the results of performing the American Society for Testing and Materials (ASTM) Standard Test Methods for Rubber Properties in Compression, procedure 1, on three samples of AKTON® visco-elastic material. This test is also known as ASTM D575-91(96), test 1.

From Table 1, at 25% deflection, i.e., when the sample is compressed 25% from its original thickness, the median deflection pressure is only 0.63 lbs. per square inch.

At 50% deflection, however, the median deflection pressure is now 3.45 lbs. per square inch, as can be seen in Table 2.

TABLE 1

25% Deflection (ASTM D575-91(96) Compression Deflection Test)

| Sample ID: Akton ® | Lbs per Square inch |
|---|---|
| 1. | 0.66 |
| 2. | 0.63 |
| 3. | 0.63 |
| Median | 0.63 |

TABLE 2

50% Deflection (ASTM D575-91(96) Compression Deflection Test)

| Sample ID: Akton ® | Lbs. per Square inch |
|---|---|
| 1. | 3.45 |
| 2. | 3.10 |
| 3. | 3.47 |
| Median | 3.45 |

TABLE 3

25% Deflection (ASTM D 575-91(96) Compression Set Test)

| Sample ID: Akton ® | % Set |
|---|---|
| 1. | 0 |
| 2. | 0 |
| 3. | 0 |
| Median | 0 |

TABLE 4

50% Deflection (ASTM D 575-91(96) Compression Set Test)

| Sample ID: Akton ® | % Set |
|---|---|
| 1. | 0 |
| 2. | 0 |
| 3. | 0 |
| Median | 0 |

Tables 3 and 4 above show the results of performing the American Society for Testing and Materials (ASTM) Standard Test Methods for Rubber Properties in Compression, Procedure 2, on three samples of AKTON® visco-elastic material. This test is also known as ASTM D575-91(96), test 2.

From Table 3 and Table 4 it can be seen that after 22 hours, the samples all recovered to 100% of their original thickness, i.e., they had a set of 0% from both 25% compression and from 50% compression.

These results show that Akton may make a very good material to include in a headrest.

In one embodiment of the headrest, the cushioning material may be a piece of Akton having a thickness in a range of 0.25 inches to 2 inches. Being Akton, the resultant headrest may have a 25% deflection pressure in a range of 0.5 to 0.8 lbs. per square inch, and a 50% deflection pressure in a range of 2.5 to 3.5 lbs. per square inch, and more preferably, a 25% deflection pressure of substantially 0.6 lbs. per square inch, and a 50% deflection pressure of substantially 3.4 lbs per square inch.

The headrest may also have a compression set characteristic such that after being compressed to 50% of an original thickness for 22 hours, the material returns to 100% of said original thickness.

The sleeve 10 may have a cover 60 (FIG. 7) which has a top and bottom and an opening and a closing mechanism, with the dimensions of the cover 60 substantially conforming to the dimensions of the sleeve. The cover 60 may be made from a soft material and may contain frictionally adherent components, such as described in the discussion of FIGS. 3 and 4. The cover may be removable or integral to the sleeve 10, as an added layer of protection for containing the cushioning material inside. The cover or the bare sleeve 10 may be any color, and may contain material suitable for disposing indicia, or other matter, including but not limited to, figures, pictures, advertising, logos, designs, or patterns.

Figure 2:
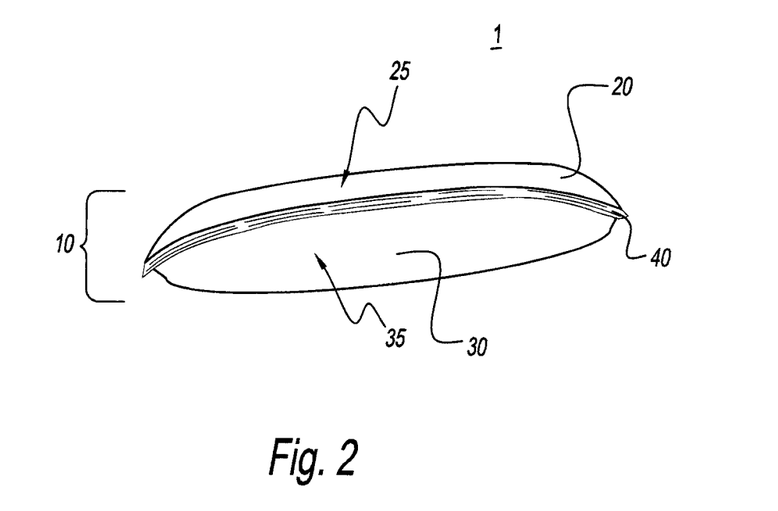
FIG. 2 is a side view of the preferred embodiment of the invention, showing a sleeve, its top and bottom surfaces and a side seam.

FIG. 2 is a side view of the preferred embodiment showing a cushion 1 with a sleeve 10, the sleeve 10 having a top surface 20, a top section 25, a bottom surface 30, a bottom section 35, and a side seam 40. The top surface 20 and the bottom surface 30 would be manufactured from separate sections of material 25 and 35, and attached together at the side seam 40. The preferred embodiment specifies the presence of the of the side seam 40 since it would function as a strengthening member by preventing deformation, tearing, and undue stretching. A side seam 40 is also a typically required by the manufacturing process for items of this type, as it is generally easier to manufacture several simple segments of material and fuse, weld or stamp them together, than it is to shape a piece of raw-material into a final product. The seam could be made by a number of methods, including but not limited to, stitching, gluing, cramping, fusing, stamping or welding, or in any other way that would create a hermetical, and durable linkage, and would also conform with any code or legal requirements for items of this nature. Alternatively, the top surface 20 and the bottom surface 30 may be manufactured as a single unit obviating the need for the side seam 40. The preferred width of the side seam 40 should be no greater then 1/16 to 1/4 of an inch. However, in a seamless embodiment, it may be desirable to impregnate the sleeve 10 with armature made of diagonal or interlaced fibers of a tough durable material, such as polymeric or fine metallic fiber. A framework created out of fine fibers would provide a desired level of structural integrity, while not compromising the flexibility of the present invention.

Figure 3:
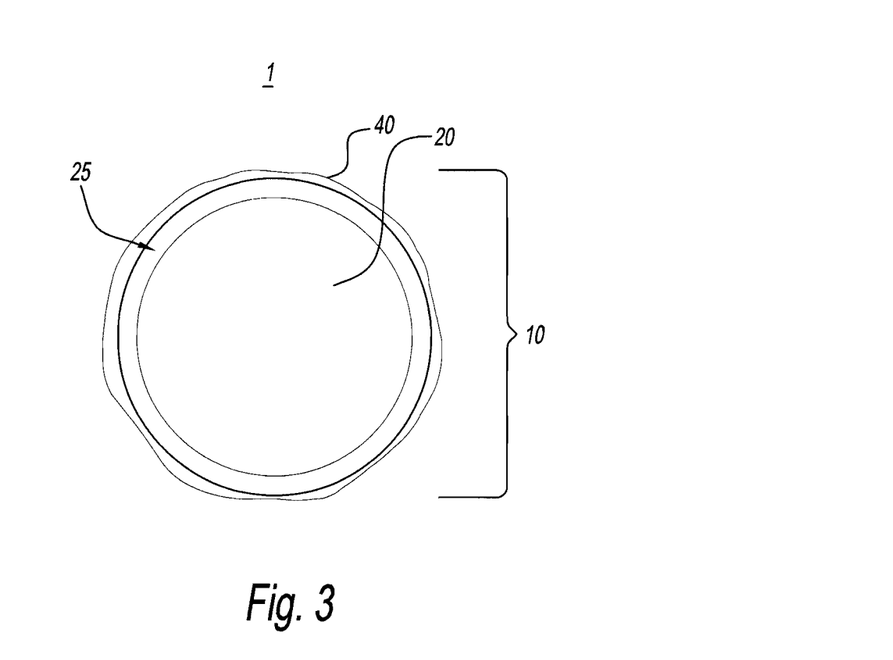
FIG. 3 is a top view of the preferred embodiment of the invention, showing a top surface and a side seam.
Figure 4:
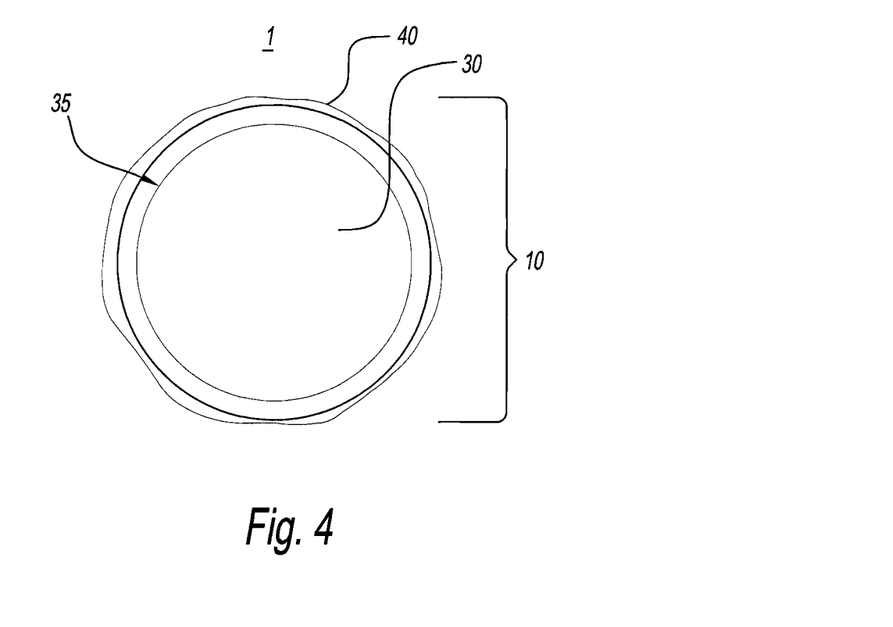
FIG. 4 is a bottom view of the preferred embodiment of the invention, showing a bottom surface and a side seam.

FIG. 3 and FIG. 4 disclose the top and the bottom views respectively of the preferred embodiment of the present invention. Shown are a cushion 1 with a sleeve 10, a top surface 20, a top section 25, a bottom surface 30, a bottom section 35, and a side seam 40. Either section 25 or 35 may be manufactured from frictional material such as but not limited to, rubber, plastic, fiber, any combination of these or other materials, or any composite material, or some other material containing increased frictional coefficient. Alternatively, the top or bottom surfaces 20 and 30 need not be frictional but may have frictional elements disposed thereon. For example, in an embodiment where the bottom surface 30 is made of cloth, a frictional element would likely be a rubber strip, multiple strips, or a plurality of interconnected strips that form a design and may be pasted or stuck onto the bottom surface 30. The frictional elements may cover the entire surface or any portion thereof. The frictional elements may be random or may be disposed in patterns, caricatures, figures, indicia, or any other desired design. The frictional elements may be any color, and may all be the same color or may be varying colors. In an ideal embodiment, the material used should be strong enough to resist tearing through rough handling, or as a result of being bitten, and at the same time be easy to disinfect and be resistant to staining. The increased friction is desirable to help keep the present invention in one place without using fastening means such as straps, snap fasteners or hook and loop fasteners. Alternatively, straps, hook and loop connectors, or snap fastener connectors can be disposed on the bottom surface 30 by default, or as required, such as in cases were friction alone will no longer hold the sleeve 10 from shifting or falling. Additionally, the bottom surface 30 may contain an elastic band (not shown) stretching from one side of the seam 40, across the bottom surface 30 to the opposite side of the seam 40, or it may be a non-elastic band disposed in a similar fashion. This type of a band may then be mounted onto a supporting surface by first pulling it away from the bottom surface 30 and then by wrapping it around a back or bottom of a chair or a top surface, or around a narrow structural element, such as an arm rest, or wrapped around some other support, surface. The present invention may utilize Velcro type hooks that would latch onto cloth covered surfaces.

Still referring to FIG. 3 and FIG. 4, the shape shown is substantially round or circular. The shape can also be square, rectangular, octagonal, or take a shape of a figure or in any other shape that still enables the present invention to fulfill its purpose as a headrest. Although shown as the same in the figures, the top and bottom surfaces 20 and 30 of the sleeve 10 or of a cover 60 may be different from each other, in means including but not limited to, surface texture, color, presence of or type of indicia, pictures, figures, designs, and patterns, or even in size, shape, or material. For instance, the sleeve or cover may be blue with a teddy bear design on the top surface, while the bottom surface is pink with a ballerina design. Alternatively, the sleeve 10 may be in the shape of a teddy bear on the top surface while the bottom surface may be round, or the entire sleeve may be in shape of a teddy bear or other shape.

Figure 5:
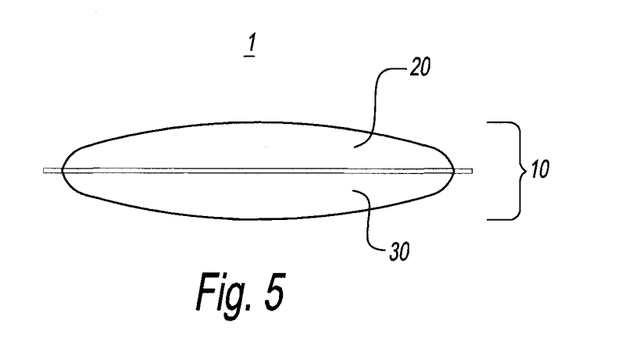
FIG. 5 is a side view of an alternative embodiment without a side seam.

As mentioned above, the top surface 20 and the bottom surface 30 can instead be formed to be one monolithic unit, thus eliminating the side seam 40. In FIG. 5, which is a side view of the present invention, showing a sleeve 10, a top surface 20 and a bottom surface 30, the side seam 40 is absent. This may be done for aesthetic considerations or to increase the flexibility of the sleeve 10. With or without the side seam 40, the present invention is highly flexible and can be deformed or folded for storage, for insertion into a protective covering or it can take the shape of the supporting surface underneath. Since this invention is very flexible and soft, there is no danger of property damage or damage to limbs if a child decides to use the invention as a toy.

Figure 6:
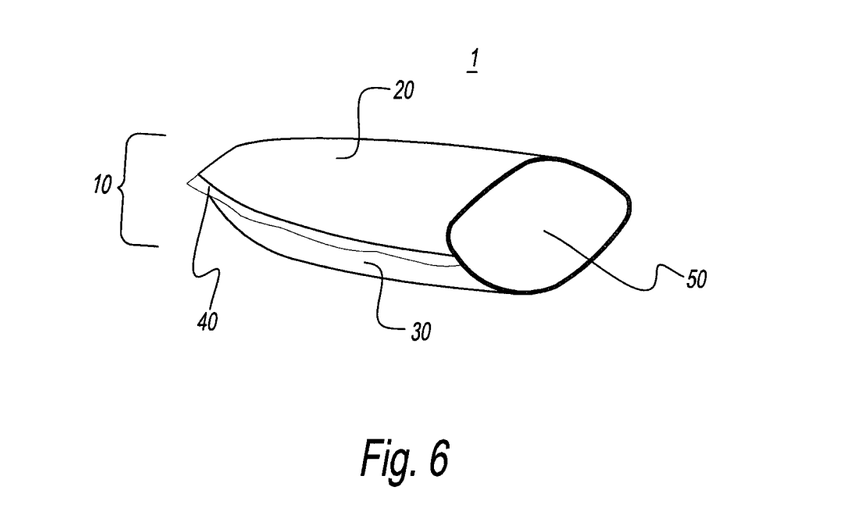
FIG. 6 is a perspective view with a cross section, showing a top and bottom surfaces, a side seam and an inner cavity.
Figure 7:
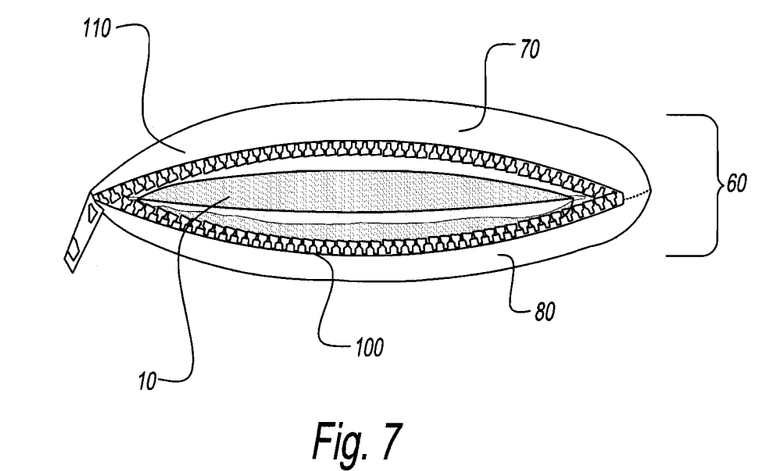
FIG. 7 is a side view of the present invention, shown encased in a pouch. The pouch for the present invention showing an opening with a closing mechanism, as well as top and bottom pouch covers.
Figure 8:
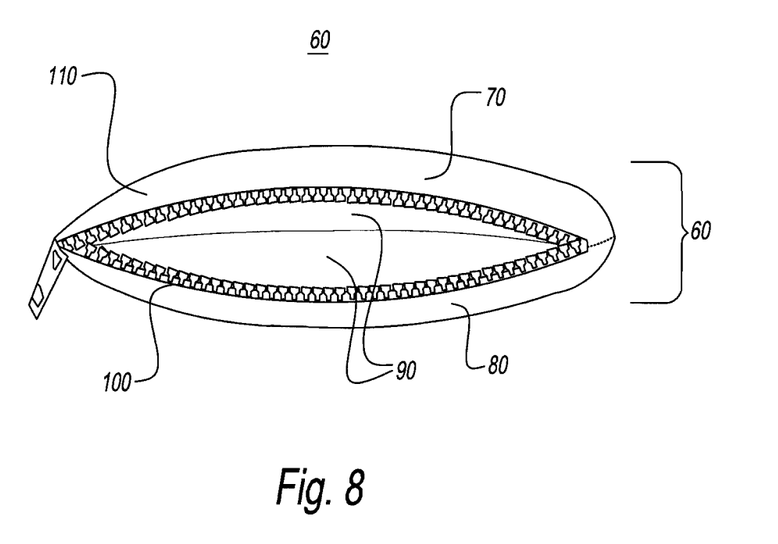
FIG. 8 is a side view of a pouch for the present invention showing an opening with a closing mechanism, a top pouch cover, and a bottom pouch cover.
Figure 9:
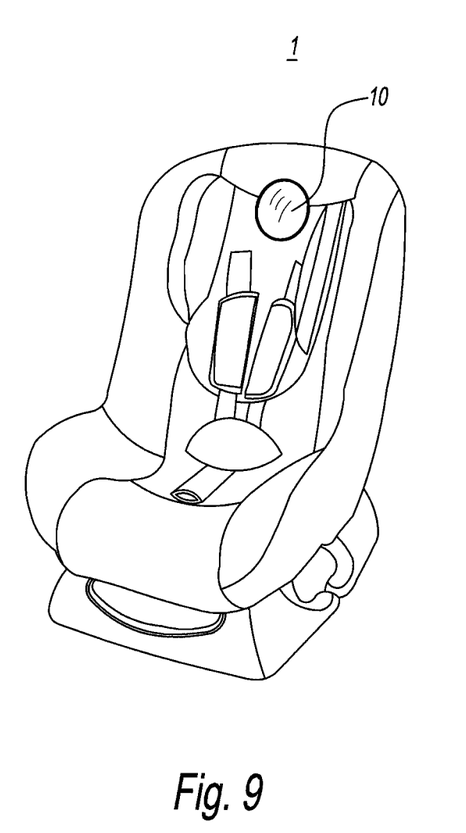
FIG. 9 is a view of the present invention being used in a child's car seat.

FIG. 6 is a perspective cross sectional view of the preferred invention.

Visible are cushion 1, a sleeve 10, a top surface 20, a bottom surface 30, a side seam 40, and inner cavity 50. In a preferred embodiment, the inner cavity may be partially or completely filled with a flowing gel-like substance, such as but not limited to, an Acton® polymer. An ideal filler, such as Acton®, would be hypoallergenic and will not leak, flow, or bottom out. Acton® polymer is also generally known for its fire retarding qualities and as being resistant to microbiological growth. The Acton® polymer would be the preferred filler since it does not cause pressure sores after prolonged usage. Alternatively any deformable substance, including but not limited to, a gel-like substance or even foam, cotton padding, liquid or fine sand can be used as filler. The cross section view of the preferred invention discloses it as being somewhat oval and substantially flat. Such a shape provides maximum utility and traction for a typical device embodied by the present invention.

In an alternative embodiment, the sleeve 10 may include an air pocket (not shown), which may additionally be adjustable. An air pocket would supplement the cushioning ability of a filler substance. An air pocket may have an external air volume adjustment pump, which may be operated manually or with an electronic mechanism. An electronically operated mechanism may additionally contain a receiver from a remote control device that would remotely signal for deflation or inflation of the internal air pocket. The air pocket additionally would provide an ability to easily adjust the surface temperature of the present invention, since the air within the air pocket may be heated or cooled prior to being impelled into the air pocket. The air pocket would be completely encased by the filler material and by sleeve 10.

Various other alternative embodiments of the present invention are also possible. For example the filler may be impregnated with various objects, such as toys or marbles, which may additionally function as bells and produce jingle noise when shaken. This would increase the fun factor of the invention, and may therefore be a desirable feature.

The sleeve 10 may also be made more intelligent and enhanced with monitoring capabilities. For example, the top surface 20 or the bottom surface 30 may contain temperature sensors that may display the child's body temperature either on a local liquid crystal or digital screen, or be able to send the temperature data remotely via a wireless transmitter to a remote receiver of a device that monitors and interprets such data. Additional sensors may measure the infants' brain activity or weight of the head, such as, but not limited to sensors that detect neurological signals within the brain, or sensors that dynamically tract the differences in weight over time. A minutest change in neurological activity or in the weight of the head may signal that a child is in distress or that there is a presence of fluids in the cranial cavity. The wireless and sensory technology is well known in the art of medical monitoring equipment. Therefore, a person skilled in this art would be able to appreciate how this technology may be integrated with the present invention.

What is claimed:

1. A baby headrest, comprising: a sleeve having a flat top surface and a bottom surface; a dry, visco-elastic polymer cushioning material disposed within said sleeve having a diameter of about 6 inches, and said cushioning material having a 25% compression force deflection in a range of 0.25 psi to 1 psi and a 50% compression force deflection in a range of 0.5 to 0.8 psi, and said cushioning material having a compression set characteristic such that after being compressed to 50% of an original thickness for 22 hours, the material returns to 100% of the original thickness and wherein the original thickness in a range of 0.25 inches to 1 inches in order to provide a headrest which is thin enough for use by an infant, small enough to be placed in any crib or a child car seat, and soft enough to prevent flat headedness, as well as eliminating the need for head supporting contours.

2. The headrest of claim 1, wherein the top surface and bottom surface is made out of tear resistant material.

3. The headrest of claim 2, wherein the sleeve is substantially deformable.

4. The headrest of claim 3, wherein the sleeve is substantially round.

5. The headrest of claim 3, wherein the sleeve is square.

6. The headrest of claim 1, further comprising a cover for the sleeve; the cover having a top and a bottom and an opening; the opening having a closing mechanism; and the sleeve substantially fitting within the cover.

7. The headrest of claim 6, wherein the cover is made out of soft fabric.

8. The headrest of claim 7, wherein the closing mechanism contains hook and loop fasteners.

9. The headrest of claim 6, wherein the sleeve frictionally adheres to the headrest to a car seat.

10. The headrest of claim 6, wherein the headrest is disposed in a baby's crib.

11. The headrest of claim 6, wherein the closing mechanism contains zip fasteners.

12. The headrest of claim 6, wherein the top and bottom surfaces are made out of stain resistant material.

\* \* \* \* \*